United States Patent

[11] 3,624,416

[72] Inventor Werner Bleickardt
Matawan, N.J.
[21] Appl. No. 886,705
[22] Filed Dec. 19, 1969
[45] Patented Nov. 30, 1971
[73] Assignee Bell Telephone Laboratories Incorporated
Murray Hill, N.J.

[54] HIGH-SPEED GATED PULSE GENERATOR USING CHARGE-STORAGE STEP-RECOVERY DIODE
3 Claims, 1 Drawing Fig.

[52] U.S. Cl. .......... 307/269, 307/281, 307/319
[51] Int. Cl. .......... H03k 5/00
[50] Field of Search .......... 307/246, 261, 268, 262, 281, 319, 269

[56] References Cited
UNITED STATES PATENTS

| | | | |
|---|---|---|---|
| 3,299,294 | 1/1967 | Koehler .......... | 307/281 X |
| 3,391,286 | 7/1968 | Casale et al. .......... | 307/319 X |

*Primary Examiner*—Stanley D. Miller, Jr.
*Attorneys*—R. J. Guenther and E. W. Adams, Jr.

ABSTRACT: A gated pulse signal generator using a charge-storage step-recovery diode whose recombination time is large in comparison with the period of an alternating current clock source and which is charged during excursions of one polarity of the clock signal and is discharged during excursions of the other polarity of the clock signal through a series path including the emitter collector circuit of a transistor. The transistor through which discharge occurs is part of an emitter-coupled pair of transistors, one of which is connected to receive a gating signal. The gating signal causes either the first or second of the two emitter-coupled transistors to conduct and the short pulses resulting from the discharge of the step-recovery diode only appear at the output of a transistor when that transistor is rendered conductive.

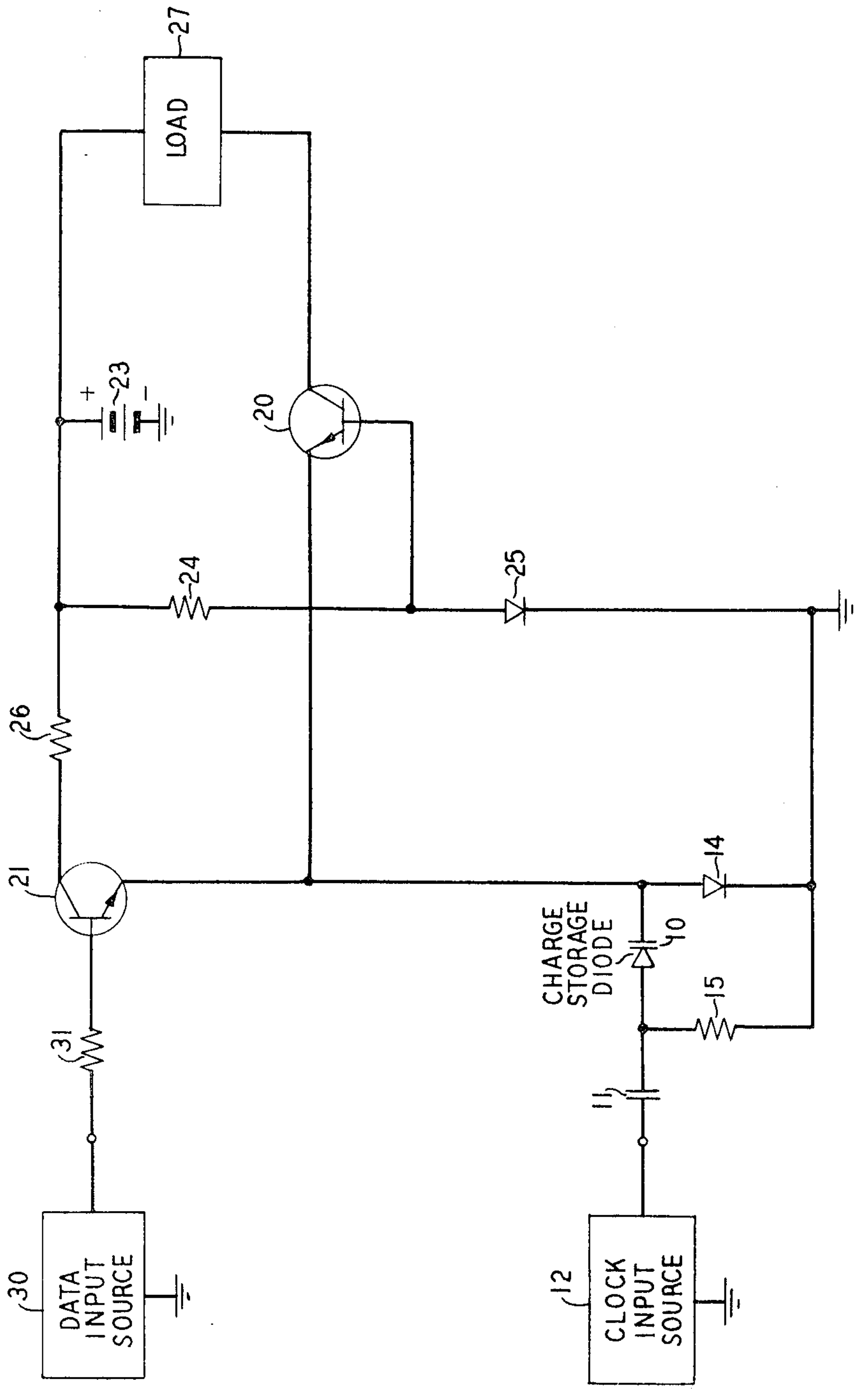
INVENTOR
W. BLEICKARDT
BY Leonard V. Arnold
ATTORNEY

HIGH-SPEED GATED PULSE GENERATOR USING CHARGE-STORAGE STEP-RECOVERY DIODE

BACKGROUND OF THE INVENTION

This invention relates to the generation of extremely short electrical pluses at high repetition rates and, more particularly, to the production of such pulses under the control of a gating signal.

In high-speed digital circuits, there is a need for short electrical pulses to drive apparatus such as binary counters, ring counters and sampling circuits. Frequently, these short pluses have to be gated by another signal. In the prior art the generation of short pulses under the control of a gating signal is accomplished by first generating a periodic stream of short pulses which are then applied to separate gating apparatus. The resulting series connection of the pulse generator and gating apparatus has two major disadvantages. First, the resulting output pulses are pattern sensitive in that the generation of an output pulse depends upon whether during preceding time slots pluses have been generated or whether they have been gated out of the signal by the gating apparatus. This pattern sensitivity results primarily from the small storage or delay associated with the tandem-connected source and gate. Second, since an additional stage is usually required, this usually results in the need for a higher power supply voltage in order to generate a pulse of a predetermined amplitude.

It is an object of the present invention to eliminate the need for gating apparatus connected in series with the source of short pluses and thereby reduce the so-called pattern sensitivity of the apparatus as well as the voltage required from the power supply.

SUMMARY OF THE INVENTION

In accordance with this invention a charge-storage step-recovery diode, having a recombination time which is large in comparison with the period of an alternating current clock source, is charged during excursions of one polarity of the clock signal and is discharged during excursions of the other polarity of the clock signal through a series path including the emitter collector of a transistor. The transistor through which discharge occurs is part of an emitter-coupled pair of transistors, one of which is connected to receive a gating signal. The gating signal causes either the first or the second of the two emitter-coupled transistors to conduct and the short pulses resulting from the discharge of the step-recovery diode only appear at the output of a transistor when that transistor is rendered conductive by the gating signal. As a result gating is accomplished right at the source of the short pulses, eliminating the need for a series combination of source and gating circuit with its attendant pattern sensitivity and higher power supply voltage requirements.

BRIEF DESCRIPTION OF THE DRAWING

This invention will be more fully comprehended from the following detailed description taken in conjunction with the attached FIG. which shows a gated short pulse generator embodying the present invention.

DETAILED DESCRIPTION

This invention makes use of a step-recovery diode which is described in the paper by S. M. Krakauer which appears at pages 1667through 1676of the July 1962issue of the Proceedings of the IRE entitled, "Harmonic Generation, Rectification, and Lifetime Evaluation with a Step Recovery Diode." During the initial phase of recovery in such a diode the conductivity remains substantially at its forward conduction value until the stored minority carriers have been depleted by the flow of reverse current and by minority current recombination. Reverse storage conduction then terminates abruptly and the diode conductivity drops to the low value usually associated with reverse saturation.

The step-recovery diode 10 is charged through capacitor 11 by the positive excursions of a sinusoidal clock signal from clock input source 12. On side of source 12 is grounded and the charging path includes not only capacitor 11 and diode 10 but also a switch diode 14 which is poled in the same direction as diode 10 and which has its cathode connected to ground. As a result, during each positive excursion of the signal from source 12, the diode 10 will begin to conduct as soon as its forward threshold is exceeded. Diode 10 has a recombination time which is large in comparison with the period of the signal from source 12, and diode 10 stores substantially all the energy contained in each positive half-cycle. A resistor 15 is connected in parallel with diodes 10 and 14 in order to provide input impedances matching and to further insure the subsequent discharge of diode 10.

When the voltage from the clock source 12 becomes negative, the diode 10 has a strong reverse current therein. This reverse current, which flows from the cathode to the anode of diode 10 through capacitor 11, and then through source 12 to ground, is derived from one or the other of two transistors 20 and 21 whose emitters are directly coupled to the cathode of diode 10. This current will be drawn from either transistor 20 or transistor 21 depending upon which of the two is more conductive. The base voltage of transistor 20 is determined by the voltage from a source 23 and the value of resistor 24 and diode 25. Diode 25 is identical to diode 14 so that in the absence of any signal current from source 12, the base emitter voltage of transistor 20 is substantially zero and no current flows in the base emitter path. If the voltage at the base electrode of transistor 20 is more positive than the voltage at the base of transistor 21, then current is drawn from a source 23 through the external load 27 and through the emitter collector circuit of transistor 20 to the diode 10. There is of course a resulting voltage drop across load 27. On the other hand, if the base voltage at transistor 21 is more positive than the base voltage at transistor 20, then the reverse current for the diode 10 is drawn from source 23 through resistor 26 and then through the emitter collector circuit of transistor 21. In such a circumstance, there is no change in the voltage across load 27 so that the output voltage across load 27 is governed by which of the transistors 20 and 21 is in conduction.

A data input signal from a source 30 is applied to the base of transistor 21 by means of resistor 31. This source 30 determines which of the two transistors 20 or 21 will be in conduction. When a 1appears at the output of source 30, transistor 21 is rendered conductive since its base electrode is at a more positive potential than the base electrode of transistor 20. On the other hand if a 0signal appears at the output of source 30, then the voltage applied to the base electrode of transistor 21 is more negative than the positive voltage at the base electrode of transistor 20. In these circumstances transistor 20 applies the reverse current for diode 10.

The pulses generated by the apparatus shown in the FIG. may be shorter than 1nanosecond in duration and have a repetition rate in the order of hundreds of megahertz and may even approach thousands of megahertz. The pulse repetition rate is the same as the frequency of the voltage received from clock source 12 which may have any convenient waveform including a sinusoidal waveform and may if desired have a DC component.

Thus in accordance with this invention the discharge path for diode 10 is determined by the output of a gating signal from source 30, and a pulse output signal will be generated across load 27 only when a zero is generated by source 30 so that transistor 20 is conductive and transistor 21 is nonconductive. Gating of the short pulses generated by the step-recovery diode has been accomplished by the addition of a transistor 20 or 21 to the usual switching transistor associated with the step-recovery diode through which discharge is normally accomplished. Because the gating function is inherently performed within the apparatus for generating the short pulses, it eliminates the need for the tandem connection of a pulse generator and gating apparatus as was required by prior art. As a result, the pattern sensitivity of a circuit embodying this invention is far less than that associated with the circuits of the prior art, and in addition, there is no need for higher power supply voltages to operate gating apparatus as is required in the prior art.

It it to be understood that the above-described circuit arrangement is merely illustrative of the application of the principles of the invention. Numerous other arrangements may be devised by those skilled in the art without departing from the spirit and scope of this invention.

I claim:

1. A gated pulse generator comprising, in combination, an alternating signal source, a charge-storage step-recovery diode having a recombination time which is large in comparison with the period of the signal from said alternating signal source, a gating signal source, a series-charging path for said charge-storage step-recovery diode operative during excursions of one polarity of the alternating signal source which includes said charge-storage step-recovery diode, said alternating signal source, and a switching diode poled in the same direction as said charge-storage step-recovery diode, a pair of emitter-coupled transistors a first of which is connected to receive at its base electrode the signals from said gating signal source, a bias voltage source connected to the collector electrode of each of said transistors so that said step-recovery diode discharges during excursions of the opposite polarity of the signal from said alternating signal source through said first discharges through the second transistor when the second transistor is conductive.

2. A gated pulse generator comprising, in combination, an alternating signal source, a charge-storage step-recovery diode having a recombination time which is large in comparison with the period of the signal from said alternating signal, a gating signal source having a first and second state in its output signal, a series-charging path for said charge-storage step-recovery diode operative during excursions of one polarity of the alternating signal source which includes said charge-storage step-recovery diode, said alternating signal source, and a switching diode poled in the same direction as said charge-storage step-recovery diode, a pair of emitter-coupled transistors a first of which is connected to receive at its base electrode the signals from said gating signal source, a bias voltage source connected to the collector electrode of said first transistor, a load connecting said bias voltage source to the collector electrode of said second transistor so that said step-recovery diode discharges through said first transistor when said gating signal source is in a first state and discharges through said second transistor when said gating signal source is in its second state.

3. A gated pulse generator comprising, in combination, an alternating signal source, a data input source having a signal with first and second states, a charge-storage step-recovery diode, a pair of transistors each having base emitter and collector electrodes with the emitters of the two transistors directly connected together, means connecting said data input source to the base of one transistor a source of current means connecting said source of current to the collector of said first transistor, means connecting a load between said source of current and the collector electrode of the second transistor, means connecting said base of said second transistor to said source of current, means connecting said charge-storage step-recovery diode between said alternating signal source and the emitters of said transistors, a charging path connected through said charge-storage step-recovery diode for charging said diode when said alternating signal has a first polarity, and a discharge path for discharging said step-recovery diode when said alternating signal has a second polarity, said data signal being cooperative with said alternating signal so that said discharge path includes the collector emitter circuit of said first transistor when said data signal is in said first state and includes said load and the collector emitter circuit of said second transistor when said data signal is in the second state.

* * * * *